US012623415B2

(12) United States Patent (10) Patent No.: US 12,623,415 B2
Engel et al. (45) Date of Patent: May 12, 2026

(54) PROCESSING SYSTEMS WITH A PLURALITY OF SUPPLY RESERVOIRS

(71) Applicant: Peridot Print LLC, Palo Alto, CA (US)

(72) Inventors: John Bradford Engel, Vancouver, WA (US); Corwin David Whitefield, Vancouver, WA (US); Justin Michael Roman, Vancouver, WA (US)

(73) Assignee: PERIDOT PRINT LLC, Palo Alto, CA (US)

( * ) Notice: Subject to any disclaimer, the term of this patent is extended or adjusted under 35 U.S.C. 154(b) by 528 days.

(21) Appl. No.: 17/802,471

(22) PCT Filed: Mar. 24, 2020

(86) PCT No.: PCT/US2020/024500
§ 371 (c)(1),
(2) Date: Aug. 25, 2022

(87) PCT Pub. No.: WO2021/194479
PCT Pub. Date: Sep. 30, 2021

(65) Prior Publication Data
US 2023/0087113 A1 Mar. 23, 2023

(51) Int. Cl.
*B29C 64/30* (2017.01)
*B29C 71/00* (2006.01)
(Continued)

(52) U.S. Cl.
CPC .......... *B29C 71/0009* (2013.01); *B29C 64/30* (2017.08); *B29C 71/02* (2013.01); *B33Y 40/20* (2020.01)

(58) Field of Classification Search
None
See application file for complete search history.

(56) References Cited

U.S. PATENT DOCUMENTS 6,916,441 B2 7/2005 Newell et al.
10,189,204 B2 1/2019 Fulop et al.
(Continued)

FOREIGN PATENT DOCUMENTS

WO 2013/078214 A1 5/2013
WO 2016/030417 A1 3/2016

*Primary Examiner* — Alison L Hindenlang
*Assistant Examiner* — Debjani Roy
(74) *Attorney, Agent, or Firm* — Michael Dryja

(57) ABSTRACT

An example processing system for processing a part includes: a processing chamber to hold the part to be processed; a plurality of supply reservoir to contain respective processing fluids; an injection system fluidly coupled to the plurality of supply reservoirs; and a controller operatively coupled to the injection system, the controller to: based on the part to be processed, select a processing sequence for processing the part; and control the injection system to execute the selected processing sequence; wherein the processing sequence is selected from: (i) injecting, sequentially, a first volume of a first processing fluid and a second volume of a second processing fluid; and (ii) combining a third volume of a third processing fluid and a fourth volume of a fourth processing fluid to form a combined processing fluid and injecting the combined processing fluid into the processing chamber.

5 Claims, 5 Drawing Sheets

100

(51) Int. Cl.
    *B29C 71/02*        (2006.01)
    *B33Y 40/20*        (2020.01)

(56)             References Cited

U.S. PATENT DOCUMENTS

| | | |
|---|---|---|
| 12,466,127 B2 * | 11/2025 | Discekici .............. B29C 64/165 |
| 2016/0106916 A1 | 4/2016 | Burmaster et al. |
| 2018/0099300 A1 * | 4/2018 | Dufort ................ B29C 71/0009 |
| 2018/0178241 A1 | 6/2018 | Luo et al. |
| 2018/0243980 A1 * | 8/2018 | Erb ........................ B29C 64/357 |
| 2019/0322898 A1 | 10/2019 | Hutchinson et al. |
| 2019/0375158 A1 * | 12/2019 | Crabtree ............. B29C 71/0009 |

\* cited by examiner

302
Identify part to be processed

304
Select processing sequence
based on part

306
Control system to execute
processing sequence

400

500

PROCESSING SYSTEMS WITH A PLURALITY OF SUPPLY RESERVOIRS

BACKGROUND

Chemical processing of manufactured parts, such as three-dimensionally printed parts, includes applying fluid compounds to such parts to modify the physical and chemical properties of the part. Different fluid compounds may be applied to modify different part properties.

DETAILED DESCRIPTION

In additive chemical processing, multiple different chemical or physical properties may be applied to manufactured parts by applying different fluid compounds. Often, the different fluid compounds are applied with different equipment, with each individual apparatus applying a single fluid compound. Thus, operators may intervene between stages to allow for multi-stage processing.

One approach to multi-fluidic systems may include two storage containers containing different fluid compounds, such as solvents. A valve allows a pump to alternately draw from one of the storage containers to deliver fluid to a chamber for processing. The valve and pump allow for sequential delivery of the different fluids and do not allow the fluids to be combined prior to delivery. Recovered solvent may be delivered directly back to the source storage container from the chamber. Other systems may includes a reservoir with two compartments; one for virgin solvent and one for recovered solvent. However, such systems do not allow for combining or serially processing a part.

An example multi-fluidic processing system may include a plurality of supply reservoirs and allow for selection of parallel or serial processing. Specifically, the processing system includes a processing chamber to hold a part to be processed, a first supply reservoir, a second supply reservoir, and an injection system. The injection system controls the injection of the first and second processing fluids from the first and second supply reservoirs into the processing chambers. The injection system may combine the first and second processing fluids or deliver the first and second processing fluids sequentially. In particular, the processing system may include a controller to select a processing sequence based on the part to be processed and to control the injection system to execute the selected processing sequence.

Figure 1:
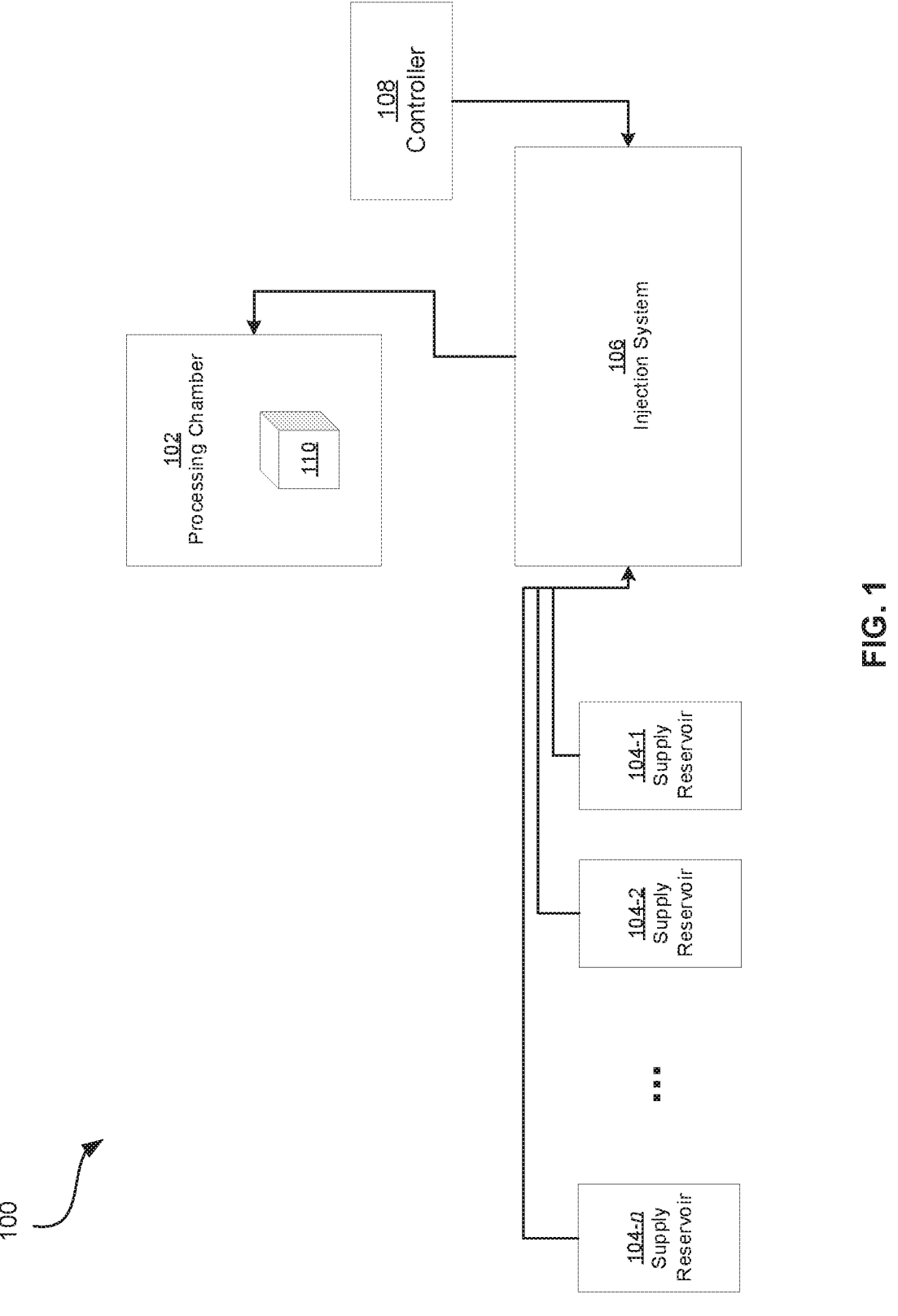
FIG. 1 is a schematic diagram of an example processing system with a plurality of supply reservoirs.

FIG. 1 shows a schematic diagram of an example processing system 100. The processing system 100 includes a processing chamber 102, a plurality of supply reservoirs, 104-1, 104-2, through to 104-n (referred to collectively as the supply reservoirs 104), an injection system 106, and a controller 108. The system 100 may be utilized to post process additive manufactured parts to modify physical and chemical properties of the parts.

Specifically, a part 110 to be processed may be held in the processing chamber 102. The system 100 may inject processing fluids (e.g., to smooth the part 110, to polish the part 110, to apply coatings, such as metallic coating, or other coatings to the part 110, or the like) into the processing chamber 102 to be applied to the part 110 to change the physical and chemical properties of at least a portion of the part 110.

Accordingly, the system 100 includes the plurality of supply reservoirs 104 to contain respective processing fluids. For example, the system 100 may include n processing fluids. For example, n may be 2, 5, 10, or a suitable number according to the desired number of various processing fluids and the physical space available in the system 100. The processing fluids, when applied to the part 110, modify the physical and/or chemical properties of at least a portion of the part.

The supply reservoirs 104 are each fluidly coupled to the injection system 106. The injection system 106, in turn, is also fluidly coupled to the processing chamber 102. Specifically, the injection system 106 is to draw fluids from the appropriate supply reservoirs 104 and inject the processing fluids into the processing chamber 102 to be applied to the part 110. The injection system 106 may include pumps, chambers, boilers, nozzles, or other suitable components to draw the processing fluids from the supply reservoirs 104 and to inject the processing fluids into the processing chamber 102. The processing fluids may be injected into the processing chamber 102 in liquid form, sprayed into the processing chamber, heated to a vapor and injected into the processing chamber 102 in vapor form, or the like.

The system 100 further includes the controller 108 operatively coupled with the injection system 106 to control the injection system 106. For example, the injection system 106 may be controlled to draw and inject the fluids sequentially or controlled to combine the fluids prior to injecting them into the processing chamber 102, according to the relevant processing sequence for the part 110 being processed. The controller 108 may include a central processing unit (CPU), a microcontroller, a microprocessor, a processing core, or similar device capable of executing instructions. The controller 108 may also include or be interconnected with a non-transitory machine-readable storage medium (e.g., a memory) that may be electronic, magnetic, optical, or other physical storage device that stores executable instructions. The memory may additionally store, for example, processing data associating parts to processing sequences, as well as the processing sequences themselves.

The instructions stored in the memory cause the controller 108 to select, based on the part 110 to be processed, a processing sequence for processing the part. For example, the controller 108 may obtain processing data for the part 110, the processing data defining the processing fluids to be applied in order to achieve the physical and chemical modifications of at least a portion of the part. The processing data may further define the sequence of processing fluids to apply and combinations of processing fluids to apply. Accordingly, the controller 108 may select the processing sequence based on said processing data. The instructions further cause the controller 108 to control the injection system 106 to execute the selected processing sequence. The processing sequence is selected from (i) injecting, sequentially, a first volume of a first processing fluid and a second volume of a second processing fluid and (ii) combining a third volume of a third processing fluid and a fourth volume of a fourth processing fluid to form a combined processing fluid and injecting the combined processing fluid into the processing chamber. In particular, the sequential processing sequence may include injecting the first processing fluid into the processing chamber, draining the processing chamber of the first processing fluid, and, after having drained the processing chamber of the first processing fluid, injecting the second processing fluid.

The system 100 thus allows a plurality of fluids to be stored and used for applying to different manufactured parts. The part may undergo a single processing sequence including having multiple different processing fluids applied to change different properties of the part, to allow serial/sequential processes without manual intervention. Further, the processing fluids may be combined in the injection system according to variable ratios to allow for greater property manipulation.

Figure 2:
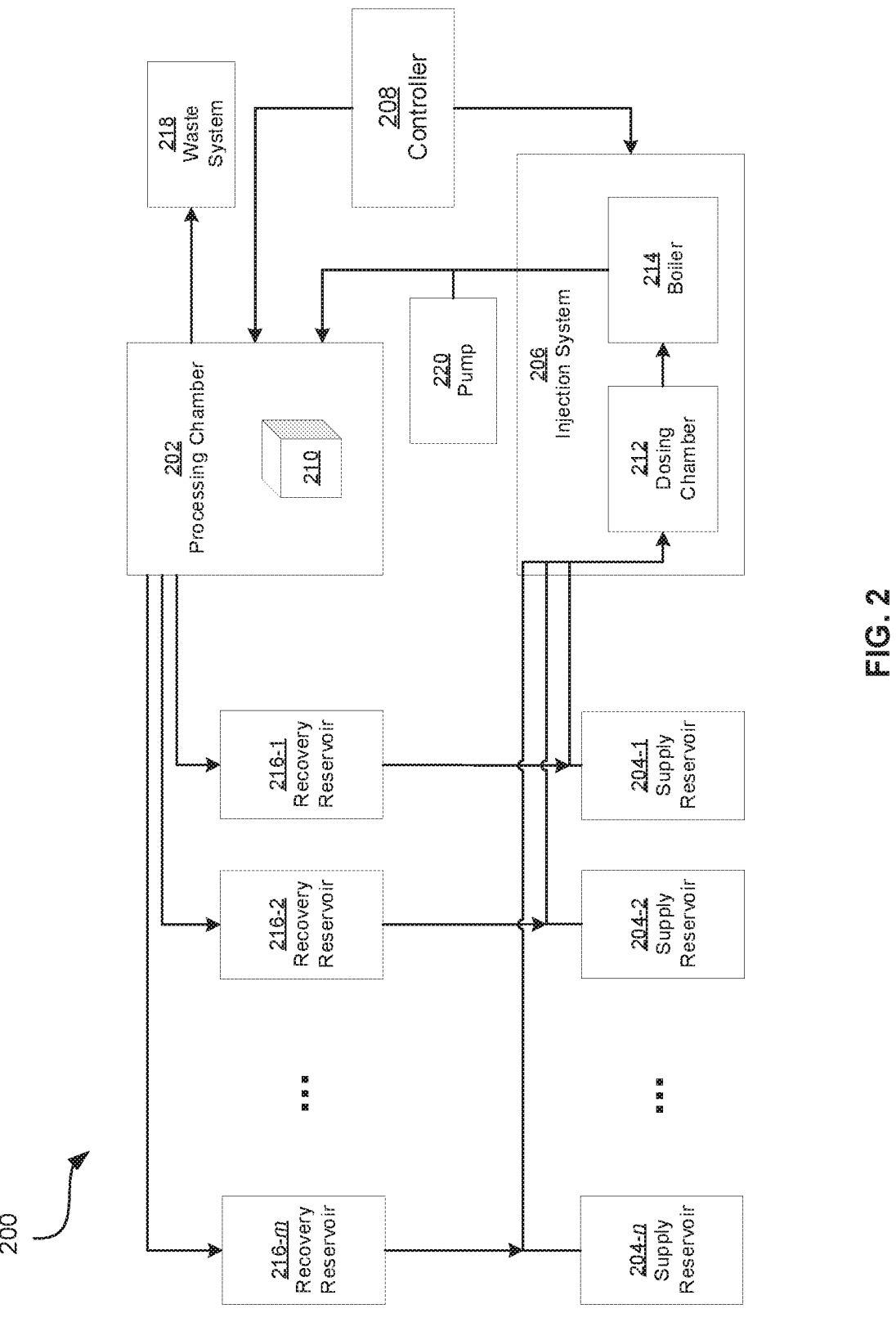
FIG. 2 is a schematic diagram of another example processing system with a plurality of supply reservoirs.

FIG. 2 depicts a schematic diagram of another example processing system 200. The processing system 200 is similar to the processing system 100 and includes a processing chamber 202 to hold a part 210, a plurality of supply reservoirs 204-1, 204-2, through to 204-n, an injection system 206, and a controller 208.

The processing chamber 202 is to hold the part 210 to be processed and may receive processing fluids to be applied to the part 210 to change the physical and chemical properties of the part 210. The supply reservoirs 204 are to contain respective processing fluids, up to a number n of processing fluids.

The injection system 206 is fluidly coupled to the plurality of supply reservoirs 204 to obtain respective processing fluids from each of the supply reservoirs 204. Specifically, the injection system 206 may perform a serial or sequential application of processing fluids, a parallel application of processing fluids, combinations of the above, and the like. The injection system 206 is to draw fluids from the appropriate supply reservoirs 204 and inject the processing fluids into the processing chamber 202 to be applied to the part 210. More particularly, the injection system 206 includes a dosing chamber 212 and a boiler 214.

The dosing chamber 212 is to measure respective volumes of the processing fluids to be injected into the processing chamber 202. The dosing chamber 212 may thus include suitable sensors, such as discrete level sensors, continuous level sensors, or the like to detect the volume of fluid contained in the dosing chamber 212. In some examples, the dosing chamber 212 may be used to combine multiple processing fluids.

The boiler 214 is coupled to the dosing chamber 212 to receive the processing fluids and heat the processing fluids prior to injection into the processing chamber 202. In some examples, the processing fluids may be heated to build pressure for injection into the processing chamber 202. That is, the boiler 214 may heat the processing fluid, causing a build-up in pressure, and the pressurized processing fluid may be released into the processing chamber. In other examples, the processing fluids may be heated to form a vapor to be injected in vapor form into the processing chamber 202. The particular method of injection of a processing fluid into the processing chamber 202 may be selected according to properties of the processing fluid and the conditions for application of the processing fluid to the part 210.

In some examples, the system 200 may additionally include a pump 220 to create a vacuum to draw the processing fluids into the dosing chamber 212 and into the boiler 214. That is, the vacuum may create a negative pressure at the dosing chamber 212 or the boiler 214 to move processing fluids from the supply reservoirs 204 towards the dosing chamber 212 and the boiler 214. Accordingly, the injection system 206 may further include pressure sensors to measure the pressure at points in the injection system 206. The pressure differential may be utilized to control the movement of the processing fluids from their respective supply reservoirs 204 to the dosing chamber 212 and to the boiler 214. More particularly, the pressure differential may be utilized to control the volume of processing fluid drawn into the dosing chamber 212. The use of pressure to control the fluid flow in combination with the dosing chamber 212 to measure and hold the fluids allows for different variable ratios of different processing fluids to be applied to the part 210.

The system 200 further includes the controller 208 operatively coupled to the injection system 206 to control the injection system 206. For example, the injection system 206 may be controlled to draw and inject the processing fluids sequentially or to combine the fluids prior to injecting them into the processing chamber 202, according to the relevant processing sequence for the part 210 being processed. The controller 208 may include a central processing unit (CPU), a microcontroller, a microprocessor, a processing core, or similar device capable of executing instructions. The controller 208 may also include or be interconnected with a non-transitory machine-readable storage medium (e.g., a memory) that may be electronic, magnetic, optical, or other physical storage device that stores executable instructions. The memory may additionally store, for example, processing data associating parts to processing sequences.

The instructions stored in the memory cause the controller 208 to select, based on the part 210 to be processed, a processing sequence for processing the part, as is described further below. For example, the controller 108 may obtain the processing data for the part 110, the processing data defining the processing fluids to be applied in order to achieve the physical and chemical modifications of at least a portion of the part. The processing data may further define the sequence of processing fluids to apply and combinations of processing fluids to apply. Accordingly, the controller 108 may select the processing sequence based on said processing data. The instructions further cause the controller 208 to control the injection system 208 as well as any other relevant components of the processing system 200, such as the processing chamber 202, to execute the selected processing sequence. The memory may further store instructions to execute the processing sequences themselves.

The system 200 may further include recovery reservoirs 216-1, 216-2, through to 216-m. The recovery reservoirs 216 are fluidly coupled to the processing chamber 202 to recover used processing fluid. That is, after processing fluids are applied to the part 210 in the processing chamber 202, the remaining processing fluid may be drained from the processing chamber 202 into one of the recovery reservoirs 216. The system 200 may include m recovery reservoirs 216 to recover m processing fluids. For example, m may be 2, 5, 10, or a suitable number according to the desired number of processing fluids to be recovered and the physical space available in the system 200.

In some examples, the system 200 may include the same number of recovery reservoirs 216 as supply reservoirs 204, for example, in a one-to-one correspondence. That is, each supply reservoir 204 may have a corresponding recovery reservoir 216 into which the used processing fluid is drained. In other examples, the system 200 may include fewer or more recovery reservoirs 216 than supply reservoirs 204. For example, some processing fluids may not be recoverable, and hence may not be drained into a recovery reservoir 216. In another example, some combinations of processing fluids may be desirable to recover, and hence the system 200 may include more recovery reservoirs 216 than supply reservoirs 204.

The recovery reservoirs 216 may further be fluidly coupled to the injection system 206 to allow the injection system 206 to draw processing fluid from the recovery reservoirs 216. For example, instead of obtaining a first processing fluid from the first supply reservoir 204-1, the injection system 206 may obtain first processing fluid from the first recovery reservoir 216-1. The system 200 thus provides for an economical use of the processing fluid by allowing re-use of the processing fluids without contamination of the supply of fresh processing fluid. Further, in such examples, the corresponding supply reservoirs 204 may be removable, for example during maintenance or to refill the supply reservoirs 204. In other examples, the recovery reservoirs 216 may be fluidly coupled to their corresponding supply reservoirs 204 to return the used processing fluid to the supply reservoir 204.

The system 200 may further include a waste system 218. The waste system 218 is coupled to the processing chamber 202 to drain waste processing fluid from the processing chamber 202. For example, after processing fluids have been combined, the combined processing fluid may be drained into the waste system 218. The waste system 218 may be, for example, a chimney to allow vapor to be vented or a waste reservoir to collect the processing fluid for appropriate disposal.

Figure 3:
FIG. 3 is a flowchart of an example method of processing parts in the system of FIG. 2.
Figure 3:
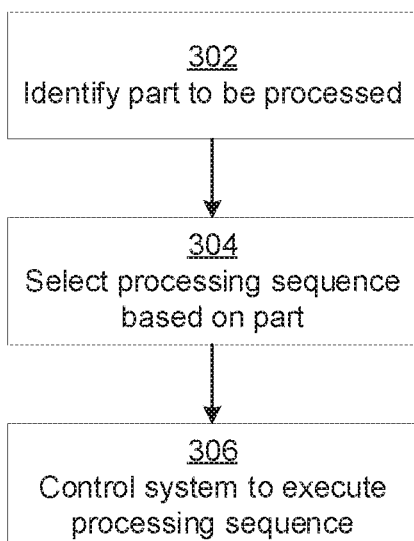

Referring now to FIG. 3, an example method 300 of processing parts is depicted. The performance method 300 is described in conjunction with its performance in the system 200, and in particular, by the controller 208, with reference to the components in the system 200. In other examples, the method 300 may be performed by other suitable systems.

At block 302, the controller 208 identifies the part 210 to be processed. For example, the controller 208 may receive input from an operator, for example at an input device of the system 200, identifying the part 210 (e.g., by a part identifier or the like). In other examples, the system 200 may include sensors to detect and identify the part 210.

At block 304, the controller 208 selects a processing sequence for processing the part 210 based on the part 210, as identified at block 302. For example, a memory of the system 200 may store processing data defining associations between the part 210 and a processing sequence to be executed. Accordingly, at block 304, the controller 208 may retrieve the processing sequence corresponding to the identified part 210. In other examples the processing sequence may be selected by an operator or based on operator input, from data in a job ticket, other data describing a type of process to be applied to the part 210, or the like.

For example, the processing sequence may be selected from (i) a serial or sequential application of processing fluids, in which the injection system 206 injects, sequentially, a first volume of a first processing fluid and a second volume of a second processing fluid; and (ii) a parallel application of processing fluids, in which the injection system 206 combines a third volume of a third processing fluid and a fourth volume of a fourth processing fluid to form a combined processing fluid and injecting the combined processing fluid into the processing chamber. In further examples, other suitable processing sequences, modifications of the processing sequences, or combinations of the processing sequences may also be selected. In particular, the processing sequence is selected according to the physical and chemical properties of the part 210 which are to be modified, as well as the available processing fluids stored in the supply reservoirs 204.

At block 306, the controller 208 controls the components of the system 200 to execute the processing sequence selected at block 304. Specifically, the controller 208 may control the injection system 206 to execute the selected processing sequence. The controller 208 may additionally control the processing chamber 202 and various system valves or flow control mechanisms to control the flow of the processing fluids between the supply reservoirs 204, the injection system 206, the processing chamber 202, the recovery reservoirs 216 and the waste system 218.

Figure 4:
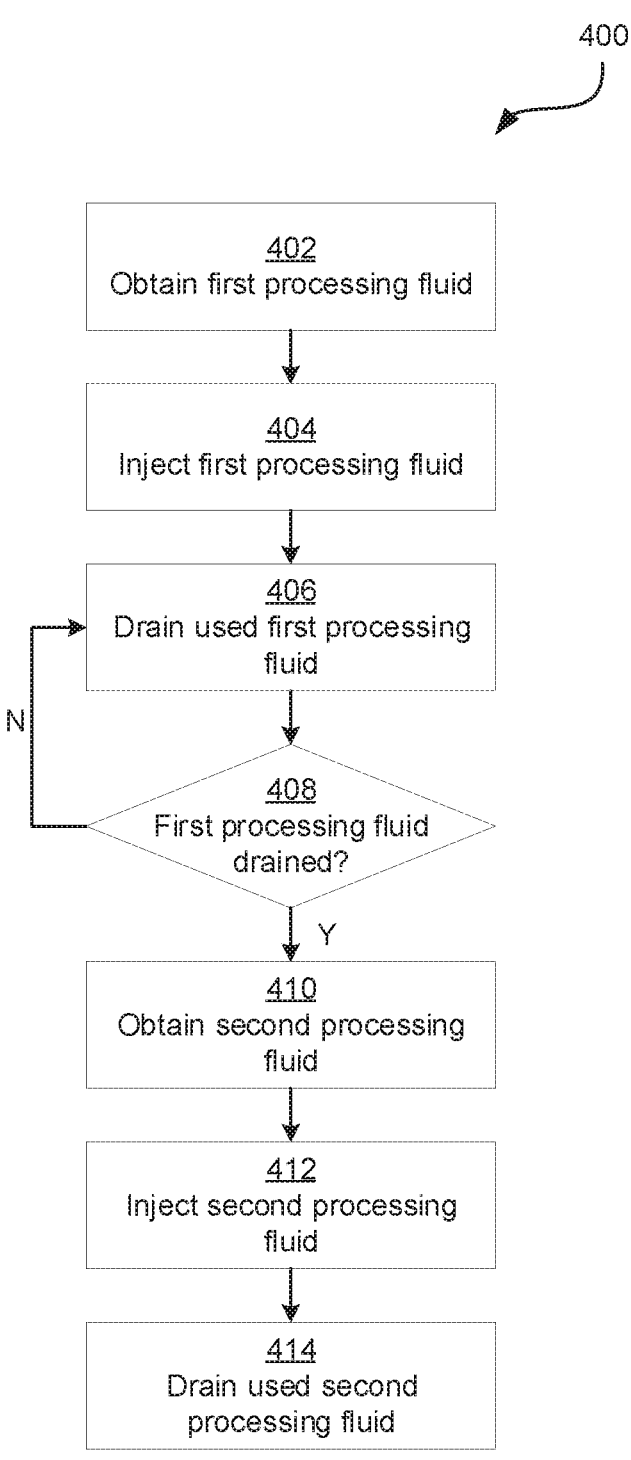
FIG. 4 is a flowchart of an example processing sequence executed in the system of FIG. 2.

For example, referring to FIG. 4, a flowchart of an example processing sequence 400 is depicted. Specifically, the processing sequence 400 is for a sequential or serial application of processing fluids.

At block 402, the injection system 206 obtains a first volume of a first processing fluid, for example, from the first supply reservoir 204-1. For example, the pump 220 may be activated to create a vacuum to draw the first processing fluid to the dosing chamber 212. In particular, the negative pressure created by the vacuum may be monitored to draw an appropriate amount of the first processing fluid. Further, the dosing chamber 212 may include sensors to detect the volume of the first processing fluid in the dosing chamber 212.

At block 404, the injection system 206 injects the first processing fluid into the processing chamber 202 to be applied to the part 210. For example, the first processing fluid may be transferred to the boiler 214 and heated in the boiler 214 to create a build-up of pressure prior to injection into the processing chamber 202. The pressurized first processing fluid may then be released into the processing chamber 202. In other examples, the boiler 214 may heat the first processing fluid to form a vapor which is injected into the processing chamber 202.

At block 406, the used first processing fluid may be drained from the processing chamber 202. For example, the used first processing fluid may be recovered in the first recovery reservoir 216-1. In other examples, the used first processing fluid may be drained to the waste system 218, for example by being vented to a chimney, or drained to a waste reservoir.

At block 408, the controller 208 determines whether the first processing fluid has been drained from the processing chamber 202. For example, sensors at the processing chamber 202 may detect the presence of processing fluid remaining in the processing chamber 202. In other examples, sensors at the first recovery reservoir 216-1 may detect an expected volume of used processing fluid to be recovered. If the determination is negative, the first processing fluid continues to be drained from the processing chamber.

If the determination is affirmative, at block 410, in response to an indication that the used first processing fluid has been drained from the processing chamber 202 into the first reservoir, the injection system 206 obtains a second volume of a second processing fluid, for example, from the second supply reservoir 204-2, For example, the pump 220 may again be activated to create a vacuum to draw the second processing fluid to the dosing chamber 212.

At block 412, the injection system 206 injects the second processing fluid into the processing chamber 202 to be applied to the part 210. For example, the second processing fluid may be heated and the pressurized second processing fluid may be released into the processing chamber 202, or the second processing fluid may be vaporized and injected into the processing chamber 202.

At block 414, the used second processing fluid may be drained from the processing chamber 202.

In other examples, the processing sequence 400 may continue with three or more processing fluids to be applied sequentially to the part 210 according to the chemical and physical properties to be modified.

Figure 5:
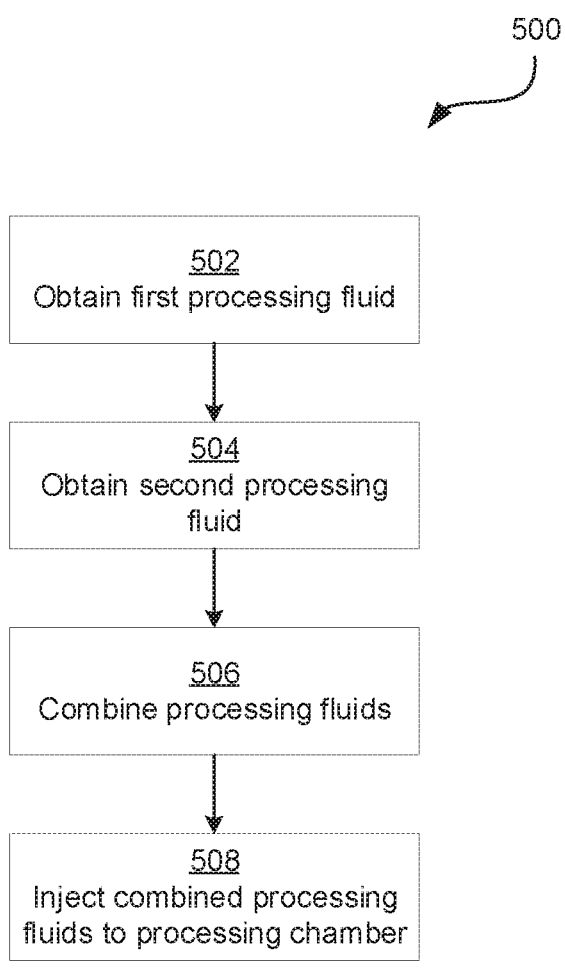
FIG. 5 is a flowchart of another example processing sequence executed in the system of FIG. 2.

Referring now to FIG. 5, a flowchart of another example processing sequence 500 is depicted. Specifically, the processing sequence 500 is for a parallel application of processing fluids.

At block 502, the injection system 206 obtains a first volume of a first processing fluid, for example, from the first supply reservoir 204-1. For example, the pump 220 may be activated to create a vacuum to draw the first processing fluid to the dosing chamber 212.

At block 504, the injection system 206 obtains a second volume of a second processing fluid. In some examples, the second processing fluid may be a different processing fluid than the first processing fluid, and may be obtained, for example, from the second supply reservoir 204-2. In other examples, the second processing fluid may be the used first processing fluid recovered from the processing chamber 202 after the first processing fluid has been applied to the part 210. That is, the injection system 206 may draw the second processing fluid from the first recovery reservoir 216-1.

At block 506, the injection system 206 combines the first volume of the first processing fluid and the second volume of the second processing fluid. For example, the first processing fluid and the second processing fluid may be combined in the dosing chamber 212 or in the boiler 214 of the injection system 206. Together, the first processing fluid and the second processing fluid form a combined processing fluid.

The injection system 206 may control the respective volumes of the first and second processing fluids to control the ratios of processing fluids present in the combined processing fluid. For example, the injection system 206 may control the ratio when combining used processing fluid from a recovery reservoir 216 with fresh processing fluid from a supply reservoir 204 to ensure that the combined processing fluid is sufficiently effective. That is, the management and re-use of the processing fluids can be used improve chemical efficiency.

At block 508, the injection system 206 injects the combined processing fluid formed at block 506 into the processing chamber 202, For example, the combined processing fluid may be heated and the pressurized combined processing fluid may be released into the processing chamber 202, or the combined processing fluid may be vaporized and injected into the processing chamber 202.

In some examples, the combined processing fluid may subsequently be drained from the processing chamber 202. For example, the combined processing fluid may be drained into the waste system 218, such as by venting to a chimney, or draining to a waste reservoir. In other examples, the combined processing fluid may be recovered in a recovery reservoir 216.

As described above, an example processing system includes multiple supply reservoirs. The processing system includes a processing chamber to hold a part to be processed, a first supply reservoir, a second supply reservoir, and an injection system. The injection system controls the injection of the first and second processing fluids from the first and second supply reservoirs into the processing chambers. The injection system may combine the first and second processing fluids, such as in a dosing chamber, or in a boiler of the injection system, or may obtain and inject the first and second processing fluids sequentially. The processing system thus also includes a controller to select a processing sequence based on the part to be processed and control the components of the system to execute the selected processing sequence. For example, the processing sequence may be selected from (i) injecting, sequentially, a first volume of a first processing fluid and a second volume of a second processing fluid; and (ii) combining a third volume of a third processing fluid and a fourth volume of a fourth processing fluid to form a combined processing fluid and injecting the combined processing fluid into the processing chamber.

The processing system thus allows for variable processing sequences to be executed to apply different processing fluids, including combinations of processing fluids, to the part to be processed. The processing sequences may be defined to combine processing fluids in pre-prescribed ratios and control the timing of introduction of each processing fluid for different stages of processing without operator intervention.

Further, in some examples, the processing system further includes recovery reservoirs to recover the processing fluids. The injection system may also be coupled to the recovery reservoirs to obtain used first and second processing fluids to be reused for processing further parts. In such systems, the supply reservoirs may then be removable for maintenance or refills without stopping the operation of the system. Further, the recovery reservoirs allow processing fluids to be re-used for more economical use of the processing fluids.

The boiler of the injection system allows the processing fluids to be heated. The injection system may use a pump to create a vacuum to precisely control the pressure in the system to draw the processing fluids into the injection system. The use of a dosing chamber in the injection system allows for precise control of ratios of mixing the processing fluids, including mixing used and fresh processing fluids, or mixing different processing fluids. The multiple supply reservoirs and recovery reservoirs whose dosage to the processing chamber is controlled by an injection system is also scalable to many reservoirs for many different fluids.

The scope of the claims should not be limited by the above examples, but should be given the broadest interpretation consistent with the description as a whole.

The invention claimed is:

1. A post-processing system comprising:
   a processing chamber to hold a finished part to be post-processed after having been additively manufactured, the processing chamber being other than any chamber in which the finished part was additively manufactured;
   a first supply reservoir to contain a first processing fluid;
   a second supply reservoir to contain a second processing fluid;
   one or more injectors directly fluidly coupled to the first and second supply reservoirs to inject the first and second processing fluids from the first and second supply reservoirs into the processing chamber;
   a first recovery reservoir fluidly coupled to the processing chamber to recover the first processing fluid after injection into the processing chamber;
   and a controller to control the injectors in accordance with a post-processing sequence for post-processing the finished part after the finished part has been additively manufactured,
   wherein the post-processing sequence comprises:
   sequentially injecting a volume of the first processing fluid into the processing chamber from the first supply reservoir and then a volume of the second processing fluid into the processing chamber from the second supply reservoir;

and in-between injecting the first and second processing fluids into the processing chamber, draining the first processing fluid from the processing chamber into the first recovery reservoir.

2. The post-processing system of claim 1, further comprising a second recovery reservoir fluidly coupled to the processing chamber to recover the second processing fluid after injection into the processing chamber.

3. The post-processing system of claim 1, further comprising a pump to create a vacuum to draw the first processing fluid from the first recovery reservoir.

4. The post-processing system of claim 3, wherein the first supply reservoir is removable.

5. The post-processing system of claim 1, wherein the first recovery reservoir is fluidly coupled to the first supply reservoir to return the first processing fluid from the first recovery reservoir to the first supply reservoir.

* * * * *